H. J. WILLIAMSON.
HORSE DETACHER.
APPLICATION FILED AUG. 14, 1909.
944,302.
Patented Dec. 28, 1909.
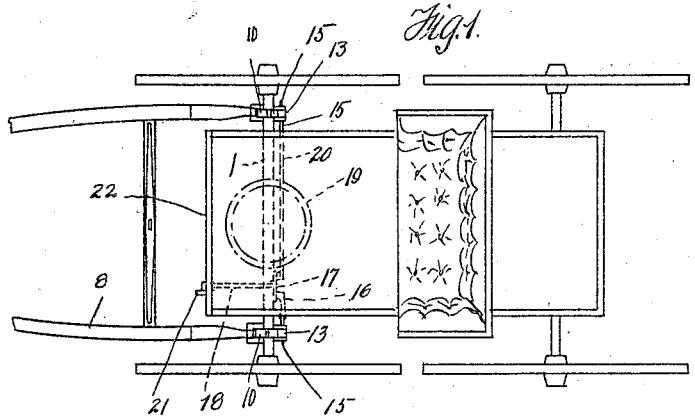
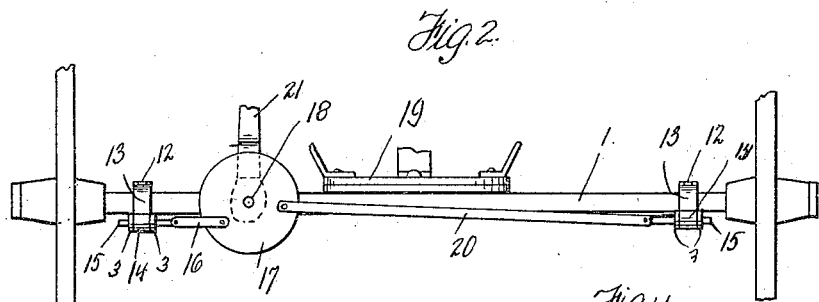
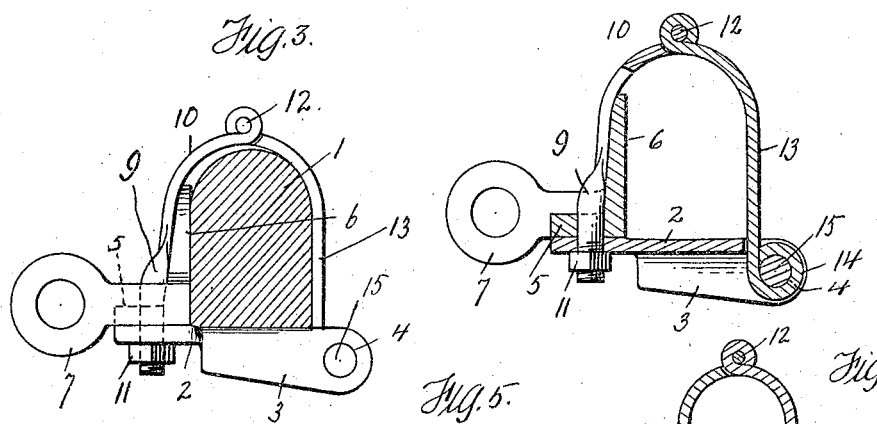
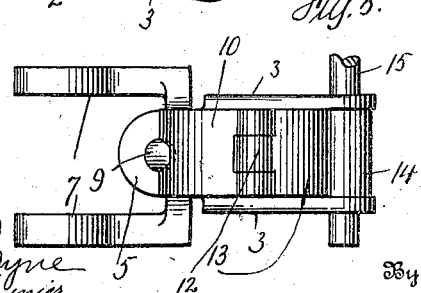
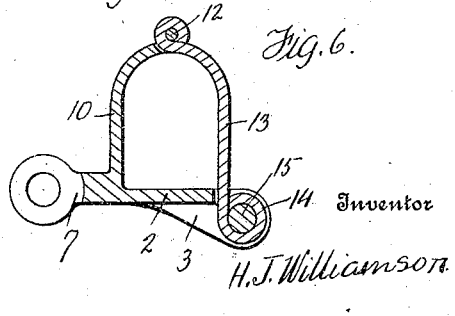
Inventor
H. J. Williamson
Witnesses

UNITED STATES PATENT OFFICE.

HARRY J. WILLIAMSON, OF MAPLETOWN, PENNSYLVANIA.

HORSE-DETACHER.

944,302.

Specification of Letters Patent.   Patented Dec. 28, 1909.

Application filed August 14, 1909.   Serial No. 512,911.

*To all whom it may concern:*

Be it known that I, HARRY J. WILLIAMSON, a citizen of the United States of America, residing at Mapletown, in the county of Greene and State of Pennsylvania, have invented certain new and useful Improvements in Horse-Detachers, of which the following is a specification, reference being had therein to the accompanying drawing.

This invention relates to a horse detacher, and more particularly to emergency couplings for buggy shafts, whereby runaway or fractious horses can be quickly released, to prevent a vehicle and the occupants thereof from being injured.

The object of the invention is to provide a simple and inexpensive device that can be applied to various kinds of vehicles, the device being applied to the front axle of a vehicle to detachably hold a pair of shafts or tongue in engagement therewith.

Another object of this invention is to accomplish the above results by a strong and durable device that can be easily and quickly operated from the dashboard or driver's seat of the vehicle.

I attain the above objects by a device that will be hereinafter described in detail and then claimed, and while there is illustrated the preferred embodiments of my invention, it must be understood that the structural elements thereof can be varied or changed, as to shape, size and manner of assemblage without departing from the spirit of the invention.

In the drawing:—Figure 1 is a plan of a vehicle equipped with my device, Fig. 2 is an enlarged elevation of the forward axle of the vehicle showing the device applied thereto, Fig. 3 is a side elevation of a clevis forming part of the device, Fig. 4 is a vertical sectional view of the same, Fig. 5 is a plan, and, Fig. 6 is a vertical sectional view of a modified form of clevis.

To put my invention into practice, I provide the forward axle 1 of a vehicle with emergency shaft couplings, each coupling consisting of a clevis having a hinge member adapted to be detachably connected to the body of the clevis. Each clevis comprises a bottom plate 2 having depending side flanges 3, the rear end of said flanges extending beyond the rear end of the plate 2 and having longitudinally alining openings 4. Connected to the forward end of the plate 2 is the apertured lug 5 of an upright 6, said upright having the sides thereof provided with forwardly extending apertured arms 7, between which the ends of a pair of shafts 8 are mounted. The apertured lug 5 is held in engagement with the forward end of the plate 2 by the bolt end 9 of a bracket 10, a nut 11 being associated with the bolt end 9 to retain the bracket 10 in position. The bracket 10 overhangs the upright 6 and hinged to the upper end of said bracket, as at 12, is a member 13, said member having the lower end thereof bent to provide a sleeve or barrel 14 adapted to fit between the rear ends of the flanges 3 and aline with the openings 4 of said flanges.

The plate 2 is adapted to engage the under side of the axle 1, the upright 6 the front side thereof, and the member 13 the rear side thereof, whereby the shaft 1 will be completely surrounded by the clevis.

Adapted to extend through the openings 4 of the flanges 3 and the sleeve or barrel 14 is a pin 15, said pin being connected by a loosely mounted link 16 to a vertical disk 17 fixedly mounted upon a shaft 18, journaled in the axle 1. The disk 17 is located to one side of the fifth wheel 19 of the vehicle, and in consequence of such an arrangement, the clevis upon the opposite side of the fifth wheel from the disk 17 is provided with a longer link 20. The forward end of the shaft 18 is provided with an upwardly extending lever 21 adapted to extend into proximity to the dashboard 22 of the vehicle, and the links 16 and 20 are connected to the disk 17 whereby when the disk 17 is moved through the medium of the lever 21, the pins 15 will be immediately withdrawn from the flanges 3 to release the hinged members 13 and allow a horse attached to the shafts 8 to depart with said shafts and the clevises connected thereto.

In Fig. 6 of the drawings, I have illustrated a slight modification of the clevises, wherein the upright 6 and the bracket 10 are combined and formed integral with the plate 2, while the flanges 3 are made similar, thereby reducing the weight of the clevis and saving material.

The disk 17 can be revolubly mounted upon the shaft 18 and the lever 21 connected direct to said disk and bent forwardly and upwardly, thereby dispensing with the revoluble shaft 18.

It is thought that the operation and utility of the horse detacher will be fully understood without further description.

Having now described my invention, what I claim as new is:—

1. In a horse detacher, the combination with the forward axle of a vehicle and a pair of shafts adapted to be attached to the same, of clevises carried by said axle and connecting with said shafts, each clevis comprising a base plate, a bracket connected to said base plate, a hinged member carried by said bracket, a pin for holding said hinged member and said base plate in engagement with said axle, a revoluble disk carried by said axle and adapted to loosely connect with the pins of said clevises, and a lever adapted to move said disk to move said pin and release said hinged members.

2. In a horse detacher, the combination with the forward axle of a vehicle, and shafts adapted to attach thereto, of clevises carried by said axle and connecting with said shafts, each clevis comprising a base plate having depending flanges, a bracket connected to said base plate, a hinged member connected to said bracket and adapted to extend between the flanges of said base plate, pins adapted to hold said member between said flanges, and means carried by said axle and adapted to connect with said pins for drawing said pins out of engagement with said hinged members, substantially as described.

In testimony whereof I affix my signature in the presence of two witnesses.

HARRY J. WILLIAMSON.

Witnesses:
GRANT R. HOUSAKER,
J. WM. RAMSAY.